US012695102B2

(12) United States Patent
Suzuki et al.

(10) Patent No.: US 12,695,102 B2
(45) Date of Patent: Jul. 28, 2026

(54) PHOTOCURABLE SHEET-SHAPED SEALING AGENT FOR FUEL CELL, CURED PRODUCT, FUEL CELL, AND SEALING METHOD

(71) Applicant: THREEBOND CO., LTD., Hachioji (JP)

(72) Inventors: Nao Suzuki, Hachioji (JP); Kazuyuki Ueno, Hachioji (JP); Yoshihide Arai, Hachioji (JP); Masayuki Tanaka, Hachioji (JP)

(73) Assignee: THREEBOND CO., LTD., Tokyo (JP)

( * ) Notice: Subject to any disclaimer, the term of this patent is extended or adjusted under 35 U.S.C. 154(b) by 626 days.

(21) Appl. No.: 18/248,275

(22) PCT Filed: Sep. 8, 2021

(86) PCT No.: PCT/JP2021/032948
§ 371 (c)(1),
(2) Date: Apr. 7, 2023

(87) PCT Pub. No.: WO2022/080044
PCT Pub. Date: Apr. 21, 2022

(65) Prior Publication Data

US 2023/0378487 A1 Nov. 23, 2023

(30) Foreign Application Priority Data

Oct. 13, 2020 (JP) ................................ 2020-172734

(51) Int. Cl.
*H01M 8/0284* (2016.01)
*H01M 8/10* (2016.01)
*H01M 8/1004* (2016.01)

(52) U.S. Cl.
CPC ....... *H01M 8/0284* (2013.01); *H01M 8/1004* (2013.01); *H01M 2008/1095* (2013.01)

(58) Field of Classification Search
CPC ............. H01M 8/0284; H01M 8/1004; H01M 2008/1095; H01M 8/0273; H01M 8/0286;
(Continued)

(56) References Cited

U.S. PATENT DOCUMENTS

2011/0206869 A1 8/2011 Nemoto et al.
2012/0012457 A1* 1/2012 Zuber ................ H01M 4/8896 204/283

(Continued)

FOREIGN PATENT DOCUMENTS

CN 107925098 A 4/2018
EP 3611200 A1 2/2020

(Continued)

OTHER PUBLICATIONS

Office Action, dated May 21, 2025, which was issued for the corresponding Chinese Patent Application No. 202180068012.6, with an English translation.

(Continued)

*Primary Examiner* — Daniel S Gatewood
(74) *Attorney, Agent, or Firm* — LUCAS & MERCANTI, LLP

(57) ABSTRACT

One embodiment of the present invention aims to provide a photocurable sheet-shaped sealing agent having adherence to an electrolyte membrane and a hydrogen gas barrier. A photocurable sheet-shaped sealing agent for fuel cell, comprising a component (A): urethane (meth)acrylate, a component (B): a phenoxy resin, and a component (C): a photopolymerization initiator.

11 Claims, 1 Drawing Sheet

(58) Field of Classification Search
CPC ........ C08F 290/067; C09K 2003/1062; C09K 3/10; Y02E 60/50
See application file for complete search history.

(56) References Cited

U.S. PATENT DOCUMENTS

| | | | |
|---|---|---|---|
| 2015/0024218 A1 | 1/2015 | Koga et al. | |
| 2018/0226664 A1 | 8/2018 | Soga et al. | |
| 2018/0241056 A1 | 8/2018 | Soga et al. | |
| 2020/0157270 A1* | 5/2020 | Soga | H01M 8/1004 |
| 2021/0206888 A1 | 7/2021 | Ueno et al. | |

FOREIGN PATENT DOCUMENTS

| | | | |
|---|---|---|---|
| JP | 2002-042835 A | 2/2002 | |
| JP | 2015189851 A | 11/2015 | |
| WO | 2010/038366 A1 | 4/2010 | |
| WO | 2013/122144 A1 | 8/2013 | |
| WO | 2017/018547 A1 | 2/2017 | |
| WO | WO-2018190421 A1 * | 10/2018 | C08K 5/5415 |
| WO | 2019230537 A1 | 12/2019 | |

OTHER PUBLICATIONS

International Search Report dated Nov. 22, 2021 for the corresponding patent application No. PCT/JP2021/032948, with English translation.

Extended European Search Report, dated Mar. 24, 2025, issued for the corresponding European Patent Application No. 21879786.8, 7 pages.

* cited by examiner

PHOTOCURABLE SHEET-SHAPED SEALING AGENT FOR FUEL CELL, CURED PRODUCT, FUEL CELL, AND SEALING METHOD

CROSS REFERENCE TO RELATED APPLICATION

This Application is a 371 of PCT/JP2021/032948 filed on Sep. 8, 2021, which claimed priority of Japanese Patent Application 2020-172734 filed on Oct. 13, 2020, both of which are incorporated herein by reference.

TECHNICAL FIELD

The present invention relates to a photocurable sheet-shaped sealing agent for fuel cell, a cured product, a fuel cell, and a sealing method.

BACKGROUND ART

In recent years, fuel cells have gained attention as a new energy system for automobiles and homes. A fuel cell is a power generation device that draws electricity by chemically reacting hydrogen and oxygen. Fuel cells are also a clean next-generation power generation device as they have a high energy efficiency during power generation and generate water through the reaction of hydrogen and oxygen. There are four types of fuel cells: solid polymer fuel cells, phosphoric acid fuel cells, molten carbonate fuel cells, and solid oxide fuel cells. Of these, solid polymer fuel cells have a high power generating efficiency while having relatively low operating temperatures (around 80° C.), and have therefore potential in applications such as power sources for automobiles, household power generation devices, small power sources for electronic devices such as cell phones, and emergency power sources.

As shown in FIG. 1, cell 1 of the solid polymer fuel cell has a structure including an electrolyte membrane electrode assembly (MEA) 5, which is a structure in which a polymer electrolyte membrane 4 is held between an air electrode (cathode) 3*a* and a fuel electrode (anode) 3*b*, a frame 6 supporting the MEA, and a separator 2 in which gas channels are formed.

To start up a solid polymer fuel cell, it is necessary to supply fuel gas containing hydrogen to the fuel electrode and oxidizing gas containing oxygen to the air electrode separately and in isolation. This is because inadequate isolation and mixing of one gas into the other may cause a decrease in power generation efficiency. Against this background, sealing agents are often used for the purpose of preventing leakage of fuel gas, oxidizing gas, or the like. Specifically, sealing agents are used between adjacent separators, between separators and frames, between frames and electrolyte membranes or MEAs, and the like.

Japanese Patent Laid-Open No. 2002-042835 discloses a sealing structure of a fuel cell for preventing leakage of fluid from between the separators of a stack in which a plurality of cells with electrolyte sandwiched between electrodes are layered via the separators, the sealing structure of the fuel cell being characterized by having an elastic film having elasticity integrally provided on one side of the separators, where the elastic film is made of a photocurable resin printed on the surface of the separator by screen printing and cured by irradiating light.

SUMMARY OF INVENTION

However, as disclosed in Japanese Patent Laid-Open No. 2002-042835, when the photocurable resin is printed on the surface of a member such as a separator by screen printing, air bubbles easily get mixed in, and the presence of these bubbles reduces the adherence to the member.

The present invention was made in consideration of the above circumstances and aims to provide a photocurable sheet-shaped sealing agent for fuel cell having adherence to an electrolyte membrane and low hydrogen gas permeability.

Means for Solving Problem

The gist of the present invention is described below.

[1] A photocurable sheet-shaped sealing agent for fuel cell, including a component (A): urethane (meth)acrylate, a component (B): a phenoxy resin, and a component (C): a photopolymerization initiator.

[2] The photocurable sheet-shaped sealing agent for fuel cell according to [1], wherein the component (A) has a polycarbonate backbone.

[3] The photocurable sheet-shaped sealing agent for fuel cell according to [1] or [2], wherein a glass transition point temperature (glass transition temperature) of the component (B) is 50 to 120° C.

[4] The photocurable sheet-shaped sealing agent for fuel cell according to any one of [1] to [3], wherein a weight average molecular weight of the component (A) is 20,000 to 100,000.

[5] The photocurable sheet-shaped sealing agent for fuel cell according to any one of [1] to [4], wherein the sealing agent comprises 4 to 70 parts by mass of the component (B) per 100 parts by mass of the component (A).

[6] The photocurable sheet-shaped sealing agent for fuel cell according to any one of [1] to [5], wherein the component (C) has a photoinitiator compound that has an absorption wavelength at 365 nm or more and decomposes upon irradiation with ultraviolet light with a wavelength at 365 nm or more, thereby generating radicals involved in polymerization.

[7] The photocurable sheet-shaped sealing agent for fuel cell according to any one of [1] to [6], further including, as the component (D), at least one of monofunctional, bifunctional, trifunctional, tetrafunctional or higher monomers having a (meth)acryloyl group.

[8] The photocurable sheet-shaped sealing agent for fuel cell according to any one of [1] to [7], wherein the photocurable sheet-shaped sealing agent for fuel cell is a sealing agent between adjacent separators in a fuel cell, or a sealing agent between a fuel cell frame and an electrolyte membrane or electrolyte membrane electrode assembly.

[9] A cured product obtained by curing the photocurable sheet-shaped sealing agent for fuel cell according to any one of [1] to [8].

[10] The cured product according to [9], wherein the cured product has a hydrogen gas permeability of $1.0\times10^{-14}$ mol·m/m$^2$·s·Pa or less.

[11] A fuel cell, including the cured product according to [9] or [10].

[12] A method for sealing at least a portion between at least two flanges of a component to be sealed having the at least two flanges, the method including:

- a step of transferring the photocurable sheet-shaped sealing agent for fuel cell according to any one of [1] to [7] to a surface of at least one of the flanges, wherein the at least one of the flanges is transmissive to active energy rays,
- a step of bonding the one flange to which the photocurable sheet-shaped sealing agent for fuel cell has been transferred to the other flange via the photocurable sheet-shaped sealing agent for fuel cell, and a step of curing the photocurable sheet-shaped sealing agent for fuel cell to seal at least a portion between the at least two flanges.

[13] A method for sealing at least a portion between at least two flanges of a component to be sealed having the at least two flanges, the method including:

a step of transferring the photocurable sheet-shaped sealing agent for fuel cell according to any one of [1] to [7] to at least one of the flanges, a step of irradiating the transferred photocurable sheet-shaped sealing agent for fuel cell with an activation energy ray for curing, thereby forming a gasket composed of the cured product, and a step of placing the other flange on the gasket and pressure-bonding the one flange to which the photocurable sheet-shaped sealing agent for fuel cell has been transferred on the other flange via the gasket, thereby sealing at least a portion between the at least two flanges.

[14] The method according to either [12] or [13], wherein, in the step of transferring the photocurable sheet-shaped sealing agent for fuel cell, the photocurable sheet-shaped sealing agent for fuel cell has been pre-die cut into a shape required for sealing.

[15] A photocurable sheet-shaped sealing agent for fuel cell, obtained by applying, to a seal adherend, a coating solution comprising a component (A): urethane (meth)acrylate, a component (B): a phenoxy resin, a component (C): a photopolymerization initiator, and an organic solvent, and drying the organic solvent.

BRIEF DESCRIPTION OF DRAWINGS

In FIG. 1, 1 indicates a cell of a solid polymer fuel cell, 2 indicates a separator, 3*a* indicates an air electrode (cathode), 3*b* indicates a fuel electrode (anode), 4 indicates a polymer electrolyte membrane, 5 indicates an electrolyte membrane electrode assembly (MEA), 6 indicates a frame, 7 indicates an adhesive or sealing agent, 8*a* indicates an oxidizing gas channel, 8*b* indicates a fuel gas channel, and 9 indicates a cooling water channel.

In FIG. 2, 10 indicates a cell stack and 11 indicates a solid polymer fuel cell.

DESCRIPTION OF EMBODIMENTS

Figure 1:
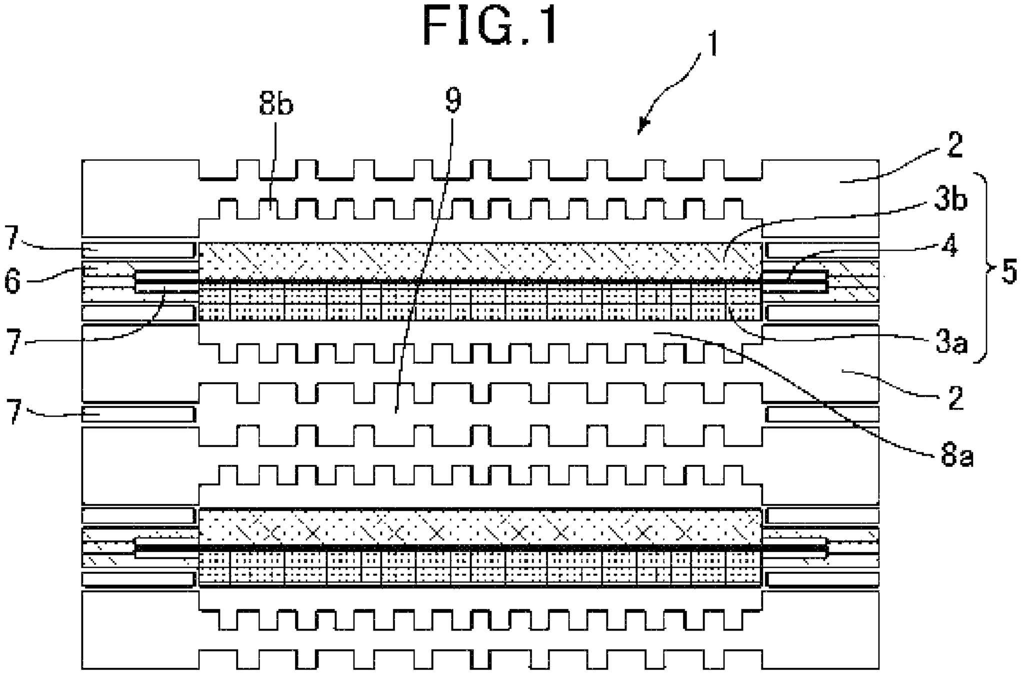
FIG. 1 is a schematic cross-sectional view of a single cell of a fuel cell.

Hereinafter the present invention will be described in detail. "X to Y" is herein used in the sense of including the numerical values (X and Y) listed before and after "to" as lower and upper limits, and means "X or more and Y or less". "(Meth)acrylate" herein means both acrylate and methacrylate.

One embodiment of the present invention relates to a photocurable sheet-shaped sealing agent for fuel cell, comprising a component (A): urethane (meth)acrylate, a component (B): a phenoxy resin, and a component (C): a photopolymerization initiator. The photocurable sheet-shaped sealing agent for fuel cell according to the present invention has adherence to an electrolyte membrane and low hydrogen gas permeability.

<Component (A)>

The urethane (meth)acrylate, component (A), used in the present invention is not particularly limited, and is preferably a urethane (meth)acrylate consisting of a reaction product of a polyol compound having two or more hydroxyl groups in the molecule, a compound having two or more isocyanate groups in the molecule, and a (meth)acrylate containing at least one or more hydroxyl groups in the molecule. Of these, urethane (meth)acrylate having a polycarbonate backbone is preferred as it allows to obtain a cured product with remarkably low hydrogen gas permeability. The weight average molecular weight of the component (A) is preferably 20,000 to 100,000, more preferably 25,000 to 90,000, and particularly preferably 30,000 to 80,000. Being in the above range allows to further blend well at the interface when bonding to the adherends such as the electrolyte membrane, separator, and frame, and to have excellent adherence to the members and remarkably low hydrogen gas permeability. In the specification, the weight average molecular weight refers to the weight average molecular weight in terms of polystyrene, as measured by gel permeation chromatography.

Examples of polyol compounds having two or more hydroxyl groups in the molecule include polyether polyols, polyester polyols, caprolactonediol, bisphenol polyols, polyisoprene polyols, hydrogenated polyisoprene polyols, polybutadiene polyols, hydrogenated polybutadiene polyols, castor oil polyols, and polycarbonate diols. Of these, polycarbonate diols, polybutadiene polyols, and hydrogenated polybutadiene polyols are preferred, and polycarbonate diols are particularly preferred as they allow to obtain a cured product with remarkably low hydrogen gas permeability. These may be used singly, or a plurality of them may be used in combination.

Examples of compounds having two or more isocyanate groups in the molecule include aromatic polyisocyanates, alicyclic polyisocyanates, and aliphatic polyisocyanates, of which aliphatic polyisocyanates and alicyclic polyisocyanates are preferred from the viewpoint of obtaining a flexible cured product. These may be used singly, or a plurality of them may be used in combination. Examples of aromatic polyisocyanates include 2,4-tolylene diisocyanate, 2,6-tolylene diisocyanate, 1,3-xylylene diisocyanate, 1,4-xylylene diisocyanate, tetramethylxylylene diisocyanate, diphenylmethane diisocyanate, naphthalene-1,5-diisocyanate, and triphenylmethane triisocyanate; examples of alicyclic polyisocyanates include isophorone diisocyanate, bis(4-isocyanatocyclohexyl)methane, 1,3-bis(isocyanatomethyl)cyclohexane, 1,4-bis(isocyanatomethyl)cyclohexane, norbornane diisocyanate, and bicycloheptane triisocyanate; and examples of aliphatic polyisocyanates include hexamethylene diisocyanate, 1,3,6-hexamethylene triisocyanate, and 1,6,11-undecatriisocyanate. Of these, diisocyanates such as isophorone diisocyanate and hexamethylene diisocyanate are preferred as they have excellent adherence to an electrolyte membrane.

Examples of (meth)acrylates containing at least one or more hydroxyl groups in the molecule include hydroxyethyl (meth)acrylate, hydroxypropyl (meth)acrylate, hydroxybutyl (meth)acrylate, mono(meth)acrylates of divalent alcohols such as ethylene glycol, propylene glycol, 1,3-propanediol, 1,3-butanediol, 1,4-butanediol, and polyethylene glycol, and mono(meth)acrylates or di(meth)acrylates of trivalent alcohols such as trimethylolethane, trimethylolpropane, and glycerin. Of these, hydroxyethyl (meth)acrylate, hydroxypropyl (meth)acrylate, or hydroxybutyl (meth)acrylate is preferred from the viewpoint of obtaining a cured product with excellent flexibility. These may be used singly, or a plurality of them may be used in combination.

The method for synthesizing urethane (meth)acrylate as the component (A) is not particularly limited, and a method known in the art can be used. Examples of the method for synthesizing urethane (meth)acrylate include a method in which a polyol compound having two or more hydroxyl groups in the molecule and an isocyanate compound having two or more isocyanate groups in the molecule are reacted in a molar ratio (polyol compound:isocyanate compound) of preferably 3:1 to 1:3 and more preferably 2:1 to 1:2 in a diluent (e.g., methyl ethyl ketone and methoxyphenol) to obtain a urethane prepolymer. The isocyanate groups remaining in the obtained urethane prepolymer are then further reacted with a sufficient amount of (meth)acrylate containing at least one or more hydroxyl groups in the molecule to react therewith.

Examples of the catalysts used in the synthesis also include triphenylaluminum, trioctylaluminum, dibutyltin dilaurate, copper naphthenate, zinc naphthenate, zinc octylate, zinc octanoate, zirconium naphthenate, cobalt naphthenate, tetra-n-butyl-1,3-diacetyloxydistanoxane, triethylamine, 1,4-diaza[2,2,2]bicyclooctane, and N-ethylmorpholine, of which dibutyltin dilaurate, zinc naphthenate, zinc octylate, or zinc octanoate is preferably used as they are highly active and allow to obtain a cured product with excellent durability. It is preferable to use 0.0001 to 10 parts by mass of these catalysts per 100 parts by mass of the total amount of reactants. The reaction temperature is also usually 10 to 100° C., and particularly preferably 30 to 90° C.

<Component (B)>

The phenoxy resin, component (B), used in the present invention is a compound obtained from epichlorohydrin and bisphenol, for example. Examples of the component (B) include bisphenol-based phenoxy resins, novolac-based phenoxy resins, naphthalene-based phenoxy resin, and biphenyl-based phenoxy resins. These may be used singly, or a plurality of them may be used in combination. As a phenoxy resin, bisphenol-based phenoxy resins are particularly preferred from the viewpoint of having good adherence to the electrolyte membrane. Of these, a copolymer phenoxy resin of bisphenol A and bisphenol F is preferred from the viewpoint of good compatibility with the component (A) of the present invention and obtaining a cured product with flexibility. These may be used singly, or a plurality of them may be used in combination.

In addition, it is preferable for the sheet-shaped sealing agent to soften during heat pressing in order to improve the efficiency of attaching to the electrolyte membrane and the like and to improve the blending with the adherend upon pressure-bonding. Therefore, the phenoxy resin has a glass transition temperature preferably in the range of 50 to 120° C., and more preferably in the range of 60 to 90° C. Being in the above range allows to blend well at the interface when bonding to the adherends such as the electrolyte membrane, separator, and frame, and to have excellent adherence to the electrolyte membrane.

Commercial products can be used as the phenoxy resin of the component (B). Examples of commercial products include PhenoTohto YP-50, PhenoTohto YP-505, PhenoTohto YP-55, PhenoTohto YP-70, ZX-1356-2, FX-316 (manufactured by new NIPPON STEEL Chemical Co., Ltd.), jER1256, jER4250 or jER4275 (manufactured by Mitsubishi Chemical Corporation), PKHB, PKHC, PKHH, PKHJ, and PKFE (manufactured by Inchem).

The amount of component (B) in the present invention (if two or more are contained, the total amount) is preferably 4 to 70 parts by mass, more preferably 10 to 60 parts by mass, and particularly preferably 15 to 50 parts by mass per 100 parts by mass of the component (A). Being in the above range is preferable from the viewpoint that it allows to obtain a cured product having further adherence to the electrolyte membrane and low hydrogen gas permeability.

<Component (C)>

The photopolymerization initiator, component (C), used in the present invention, is a compound that generates radicals when irradiated with active energy rays such as ultraviolet light. The component (C) is preferably a compound that has an absorption wavelength at 365 nm or more from the viewpoint that it can be sufficiently photocured even by light irradiation over a frame and has excellent adhesion to the electrolyte membrane, and that decomposes upon irradiation with ultraviolet light with a wavelength at 365 nm or more, thereby generating radicals involved in polymerization; and specific examples thereof include thioxanthone-based photo-radical polymerization initiators, and acylphosphine oxide-based photo-radical polymerization initiators. These may be used singly, or in combinations of two or more thereof.

Examples of thioxanthone-based photo-radical polymerization initiators include, but are not limited to, 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one mesochloride. Examples of acylphosphine oxide-based photo-radical polymerization initiators include, but are not limited to, bis(2,4,6-trimethylbenzoyl)-phenylphosphine oxide, 2,4,6-trimethylbenzoyl-diphenylphosphine oxide, and 2,4,6-trimethylbenzoyl phenylethoxyphosphine oxide.

The amount of component (C) in the present invention (if two or more are contained, the total amount) is preferably 0.1 to 10 parts by mass, and more preferably 0.3 to 5 parts by mass per 100 parts by mass of the component (A). Being in the above range allows to have excellent adherence to the electrolyte membrane.

<Component (D)>

To the present invention, at least one of monofunctional, bifunctional, trifunctional, tetrafunctional or higher monomers having a (meth)acryloyl group may be further added as the component (D). These can be used singly or as a mixture of two or more.

Examples of monofunctional monomers having a (meth)acryloyl group include lauryl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, butoxyethyl (meth)acrylate, 2-hydroxyethyl (meth)acrylate, 2-hydroxypropyl (meth)acrylate, glycerol (meth)acrylate, modified butyl (meth)acrylate, epichlorohydrin-modified phenoxy (meth)acrylate, N,N-dimethylaminoethyl (meth)acrylate, N,N-diethylaminoethyl (meth)acrylate, and morpholino (meth)acrylate. Examples of bifunctional monomers having a (meth)acryloyl group include neopentyl glycol di(meth)acrylate, bisphenol A di(meth)acrylate, epichlorohydrin-modified bisphenol A di(meth)acrylate, stearic acid-modified pentaerythritol di(meth)acrylate, dicyclopentenyl di(meth)acrylate, and di(meth)acryloyl isocyanurate. Examples of trifunctional monomers having a (meth)acryloyl group include trimethylolpropane tri(meth)acrylate, pentaerythritol tri(meth)acrylate, epichlorohydrin-modified trimethylolpropane tri(meth)acrylate, epichlorohydrin-modified glycerol tri(meth)acrylate, and tris(acryloyloxyethyl)isocyanurate. Examples of polyfunctional monomers having a (meth)acryloyl group include ditrimethylolpropane tetra(meth)acrylate, pentaerythritol tetra(meth)acrylate, dipentaerythritol monohydroxy penta(meth)acrylate, alkyl-modified dipentaerythritol pentaacrylate, and dipentaerythritol hexa(meth)acrylate. These polymerizable monomers can be used singly or as a mixture of two or more.

Of these, the component (D) is preferably a (meth) acrylate monomer having 8 to 25 repeating ether bond structural units, and more preferably a (meth)acrylate monomer having 9 to 20 or 14 to 23 repeating ether bond structural units as they have excellent adherence to various members. Specific examples include polyethylene glycol mono(meth)acrylate, polyethylene glycol di(meth)acrylate, polypropylene glycol mono(meth)acrylate, polypropylene glycol di(meth)acrylate, polyoxytetramethylene glycol mono(meth)acrylate, and polyoxytetramethylene glycol di(meth)acrylate. Examples of commercial products include, but are not limited to, M-90G, AM-130G, M-90G, M-230G, A-400, A-600, APG-700, A-1000, 9G, 14G, 23G, 1206PE (manufactured by Shin-Nakamura Chemical Co., Ltd.), PDE-600, PDP-700, ADE-600 (manufactured by NOF CORPORATION), Light Ester 130MA, Light Ester 130MA, Light Ester 130A, 14EG, and 14EG-A (Kyoeisha Chemical Co., Ltd.).

The amount of component (D) in the present invention (if two or more are contained, the total amount) is preferably 1 to 50 parts by mass, more preferably 1.5 to 30 parts by mass, and particularly preferably 2 to 20 parts by mass per 100 parts by mass of the component (A). Being in the above range allows to further have excellent adherence to various members.

<Component (E)>

In the present invention, a silane coupling agent may be further contained as the component (E) for the purpose of improving adherence to the electrolyte membrane, frame, and the like. Examples of the component (E) include glycidyl group-containing silane coupling agents such as 2-(3,4-epoxycyclohexyl)ethyltrimethoxysilane, 3-glycidoxypropyltriethoxysilane, 3-glycidoxypropylmethyldimethoxysilane, 3-glycidoxypropyltrimethoxysilane, and 3-glycidoxypropylmethyldiethoxysilane; vinyl group-containing silane coupling agents such as vinyltris(β-methoxyethoxy)silane, vinyltriethoxysilane and vinyltrimethoxysilane; (meth)acrylic group ((meth) acryloyl group)-containing silane coupling agents such as γ-methacryloxypropyltrimethoxysilane; amino group-containing silane coupling agents such as N-β-(aminoethyl)-γ-aminopropyltrimethoxysilane, γ-aminopropyltriethoxysilane and N-phenyl-γ-aminopropyltrimethoxysilane; others such as γ-mercaptopropyltrimethoxysilane, and γ-chloropropyltrimethoxysilane. Of these, glycidyl group-containing silane coupling agents or (meth)acrylic group-containing silane coupling agents are preferably used from the viewpoint that further improvement in adherence can be expected. These may be used singly, or in combinations of two or more thereof.

The amount of component (E) in the present invention (if two or more are contained, the total amount) is preferably 0.1 to 10 parts by mass, more preferably 0.5 to 7 parts by mass, and particularly preferably 1 to 5 parts by mass per 100 parts by mass of the component (A). Being in the above range allows to further have excellent adherence to various members.

To the sheet-shaped sealing agent of the present invention, additives (optional components) such as peroxides, various elastomers such as acrylic rubber, urethane rubber, and styrene-based copolymers, fillers, storage stabilizers, antioxidants, light stabilizers, plasticizers, dyes, pigments, flame retardants, sensitizers, thermal radical initiators, organic solvents, heavy metal deactivators, ion trapping agents, emulsifiers, water dispersion stabilizers, defoaming agents, mold release agents, leveling agents, waxes, rheology control agents, and surfactants may be blended in appropriate amounts.

To the present invention, peroxides may be added as they can impart heat curability when the adherend is not light-transmissive.

To the present invention, fillers may also be added to the extent that they do not impair storage stability, for the purpose of improving the elastic modulus, fluidity, and the like of the cured product. Specific examples thereof include organic powders, inorganic powders, and metallic powders. Examples of inorganic powder fillers include glass, fumed silica, alumina, mica, ceramics, silicone rubber powder, calcium carbonate, aluminum nitride, carbon powder, kaolin clay, dry clay minerals, and dry diatomaceous earth. The amount of inorganic powder is preferably about 0.1 to 100 parts by weight per 100 parts by weight of the component (A).

Fumed silica-based fillers are blended for the purpose of improving the mechanical strength of the cured product. Preferably, those hydrophobically treated with organochlorosilanes, polyorganosiloxane, hexamethyldisilazane, and the like are used. Specific examples of fumed silica include commercial products such as AEROSIL (trade name) R974, R972, R972V, R972CF, R805, R812, R812S, R816, R8200, RY200, RX200, RY200S, and R202 manufactured by Nippon Aerosil.

Of the above optional components, the addition of antioxidants and light stabilizers is preferred to improve the storage stability and weather resistance of the photocurable sheet-shaped sealing agent for fuel cell. As antioxidants, phenolic antioxidants, hindered phenolic antioxidants, organic sulfur antioxidants, amine antioxidants, and benzotriazole-based antioxidants can be used. As light stabilizers, hindered amine light stabilizers and benzoate-type light stabilizers can be used. Furthermore, the following commercial products can be used as antioxidants and light stabilizers. Examples thereof include Sumilizer BHT, Sumilizer S, Sumilizer BP-76, Sumilizer MDP-S, Sumilizer GM, Sumilizer BBM-S, Sumilizer WX-R, Sumilizer NW, Sumilizer BP-179, Sumilizer BP-101, Sumilizer GA-80, Sumilizer TNP, Sumilizer TPP-R, Sumilizer P-16 (manufactured by Sumitomo Chemical Co., Ltd.), ADK STAB AO-20, ADK STAB AO-30, ADK STAB AO-40, ADK STAB AO-50, ADK STAB AO-60, ADK STAB AO-70, ADK STAB AO-80, ADK STAB AO-330, ADK STAB PEP-4C, ADK STAB PEP-8, ADK STAB PEP-24G, ADK STAB PEP-36, ADK STAB HP-10, ADK STAB 2112, ADK STAB 260, ADK STAB 522A, ADK STAB 329K, ADK STAB 1500, ADK STAB C, ADK STAB 135A, ADK STAB 3010 (manufactured by AREA Co., Ltd.), Tinuvin 770, Tinuvin 765, Tinuvin 144, Tinuvin 622, Tinuvin 111, Tinuvin 123, and Tinuvin 292 (manufactured by Ciba Specialty Chemicals). The amount of these antioxidants and light stabilizers is not particularly limited, and is preferably 0.001 to 5 parts by mass, and more preferably 0.01 to 3 parts by mass per 100 parts by mass of the component (A).

Examples of organic solvents that can be used in the present invention include alcohols such as methanol and ethanol; chlorinated solvents such as dichloroethane and trichloroethane; fluorinated solvents such as trichlorofluoroethane; ketone solvents such as acetone, methyl ethyl ketone, and methyl isobutyl ketone; acetate ester solvents such as methyl acetate, ethyl acetate, propyl acetate, and butyl acetate; dimethyl ether, methyl ethyl ether, diethyl ethers; alkane solvents such as pentane, hexane, heptane, and cyclohexane; and aromatic hydrocarbon solvents such as benzene, toluene, and xylene. Of these, ketone solvents are preferred because of their high compatibility with the components (A), (B) and (C) of the present invention. The composition containing the components (A) to (C) of the present invention diluted in an organic solvent is called a coating solution.

The photocurable sheet-shaped sealing agent for fuel cell of the present invention can be produced by a conventionally known method in the art. For example, it can be produced by blending predetermined amounts of the components (A) to (C) and the like and mixing at a temperature of preferably 10 to 70° C. for preferably 0.1 to 5 hours using mixing means such as a mixer. In addition, it is preferably produced in a lightproof environment.

The method for processing the present invention into a sheet is not particularly limited, and for example, a technique known in the art can be used. For example, a sheet having an arbitrary film thickness can be obtained by diluting a composition containing the components (A) to (C) of the present invention in an organic solvent to prepare a liquid coating solution, which is then applied onto a support such as a polyethylene terephthalate film that has undergone mold release treatment in advance, by a flow coating method, roll coating method, gravure roll coating method, wire bar coating method, lip die coating method, or the like, and then drying the organic solvent. When preparing the coating solution, it can be diluted with a solvent after blending each component, or it can be pre-diluted with a solvent before blending each component. The sheet can also be obtained by applying, to a seal adherend, a coating solution containing the components (A) to (C) of the present invention and an organic solvent, and then drying the organic solvent. Note that the sheet in which the organic solvent has been volatilized from the coating solution is in an uncured (unreacted) state.

The thickness of the photocurable sheet-shaped sealing agent for fuel cell of the present invention is preferably about 1 to 500 μm, more preferably 5 to 400 μm, and still more preferably 10 to 200 μm. Being in the above range is preferable as it allows to have excellent adherence to the electrolyte membrane and remarkably low hydrogen gas permeability.

The photocurable sheet-shaped sealing agent for fuel cell of the present invention preferably has a three-layer structure consisting of a support, a sealing agent layer, and a release film from the viewpoint of ease of handling and storage performance. When bonding to a member, the support and release film can be peeled off for convenience. Examples of the material of the support or release film include plastic film such as polyethylene, polypropylene, polyethylene terephthalate, and polyester film, paper, cloth, and non-woven fabric, and plastic film is preferred from the viewpoint of mold releasability. The thickness of the support and release film is preferably 3 to 300 μm, and more preferably about 5 to 150 μm. The release film has preferably undergone mold release treatment with a fluorinated compound, silicone compound, or long-chain alkyl compound from the viewpoint of enhancing the peelability from the sealing agent layer.

<Cured Product>

The cured product of the present invention is cured by irradiating the photocurable sheet-shaped sealing agent of the present invention with active energy rays such as ultraviolet light. The cured product of the present invention can be cured by any method as long as the photocurable sheet-shaped sealing agent of the present invention is cured.

<Applications>

An application in which the photocurable sheet-shaped sealing agent of the present invention or a cured product thereof is suitably used is a fuel cell.

<Fuel Cell>

A fuel cell is a power generation device that generates electricity by chemically reacting hydrogen and oxygen. There are four types of fuel cells: solid polymer fuel cells, phosphoric acid fuel cells, molten carbonate fuel cells, and solid oxide fuel cells. Of these, solid polymer fuel cells have a high power generating efficiency while having relatively low operating temperatures (around 80° C.), and are therefore used in applications such as power sources for automobiles, household power generation devices, small power sources for electronic devices such as cell phones, and emergency power sources.

Figure 2:
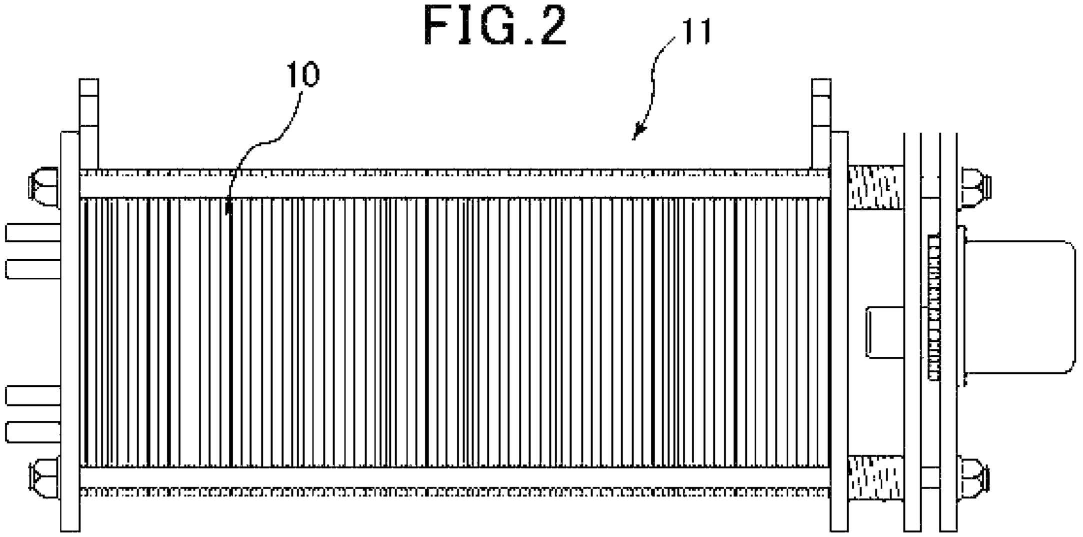
FIG. 2 is a schematic view of an entire fuel cell.

As shown in FIG. 1, cell 1 of the representative solid polymer fuel cell has a structure including an electrolyte membrane electrode assembly (MEA) 5, which is a structure in which a polymer electrolyte membrane 4 is held between an air electrode (cathode) 3*a* and a fuel electrode (anode) 3*b*, a frame 6 supporting the MEA, and a separator 2 in which gas channels are formed. At the startup of the solid polymer fuel cell, fuel gas (hydrogen gas) and oxidizing gas (oxygen gas) are supplied through an oxidizing gas channel 8*a* and a fuel gas channel 8*b*. Cooling water is also flowed through a cooling water channel 9 for the purpose of mitigating the heat generated during power generation. The package obtained by stacking several hundred of these cells is called a cell stack 10, as shown in FIG. 2. The solid polymer fuel cell 11 has this cell stack 10.

When fuel gas (hydrogen gas) is supplied to the fuel electrode and oxidizing gas (oxygen gas) is supplied to the oxygen electrode (air electrode), the following reactions occur at each electrode, and overall, a reaction generating water ($H_2+½O_2→H_2O$) occurs. To explain in detail, as described below, the protons ($H^+$) generated at the fuel electrode diffuse through the solid polymer membrane (polymer electrolyte membrane) and move to the oxygen electrode side, and the water ($H_2O$) generated by their reaction with oxygen is discharged from the oxygen electrode side.

$H_2→2H^++2e^-$ Fuel electrode (anode):

$½O_2+2H^++2e^-→H_2O$ Oxygen electrode (cathode):

To start up a solid polymer fuel cell, it is necessary to supply fuel gas containing hydrogen to the anode and oxidizing gas containing oxygen to the cathode separately and in isolation. This is because inadequate isolation and mixing of one gas into the other may cause a decrease in power generation efficiency. Against this background, sealing agents are often used for the purpose of preventing leakage of fuel gas, oxygen gas, or the like. Specifically, sealing agents are used between adjacent separators, between separators and frames, between frames and electrolyte membranes or MEAs, and the like.

Examples of the polymer electrolyte membrane include cation exchange membranes with ion conductivity, preferably fluorinated polymers having a sulfonic acid group as shown in formula (3) as they are chemically stable and resistant to operations at high temperatures. Examples of commercial products include Nafion (registered trademark) manufactured by DuPont, Flemion (registered trademark) manufactured by AGC Inc., and Aciplex (registered trademark) manufactured by Asahi Kasei Corporation. Usually, polymer electrolyte membranes are a material having difficulty in adhesion, but can be adhered by using the photocurable sheet-shaped sealing agent of the present invention.

[Formula 1]

(3)

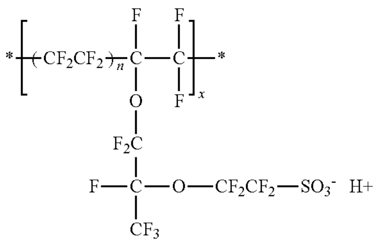

The fuel electrode is called a hydrogen electrode or anode, and those known in the art are used. For example, catalysts such as platinum, nickel, and ruthenium supported on carbon are used. The air electrode is called an oxygen electrode or cathode, and those known in the art are used. For example, catalysts such as platinum and alloys supported on carbon are used. The surface of each electrode may be provided with a gas diffusion layer that acts to diffuse gas and retain moisture in the electrolyte. As a gas diffusion layer, those known in the art are used, and examples thereof include carbon paper, carbon cloth, and carbon fibers.

The above separator 2 has fine convex and concave channels, as shown in FIG. 1, through which fuel gas and oxidizing gas pass and are supplied to the electrodes. The separator is composed of aluminum, stainless steel, titanium, graphite, carbon, and the like.

The frame is to support and reinforce the thin electrolyte membrane or MEA so that it does not tear. Examples of the material of the frame include thermoplastic resins such as polyvinyl chloride, polyethylene naphthalate (PEN), polyethylene terephthalate, polypropylene, and polycarbonate. In order to bond a member using the photocurable sheet-shaped sealing agent of the present invention or a cured product thereof, it is preferable that the member be light-transmissive.

The fuel cell of the present invention is a fuel cell characterized by being sealed by the photocurable sheet-shaped sealing agent of the present invention or a cured product thereof. Examples of members that require sealing in fuel cells include the separators, frames, electrolytes, fuel electrodes, air electrodes, and MEAs. More specific sealing locations include between adjacent separators, between separators and frames, and between frames and electrolyte membranes or MEAs. The main purpose of the sealing "between separators and frames" or "between polymer electrolyte membranes or MEAs and frames" is to prevent gas mixing or leakage, while the purpose of the sealing between adjacent separators is to prevent gas leakage and to prevent the cooling water from leaking from the cooling water channel to the outside. Since the acid generated from the electrolyte membrane creates a strong acid atmosphere, acid resistance is required for the sealing agent.

<Sealing Method>

The sealing method using the photocurable sheet-shaped sealing agent of the present invention is not particularly limited, and examples thereof include the following two methods.

The first sealing method is as follows.

It is a method for sealing at least a portion between at least two flanges of a component to be sealed having the at least two flanges, characterized by including a step of transferring the photocurable sheet-shaped sealing agent for fuel cell of the present invention to a surface of at least one of the flanges, wherein the at least one of the flanges is transmissive to active energy rays, a step of bonding the one flange to which the photocurable sheet-shaped sealing agent for fuel cell has been transferred to the other flange via the photocurable sheet-shaped sealing agent for fuel cell, and a step of curing the photocurable sheet-shaped sealing agent for fuel cell to seal at least a portion between the at least two flanges.

The first sealing method will be described using the sealing method between an electrolyte membrane and a frame as an example. The sealing method consists of three main steps: a transfer step, a bonding step, and a curing step. The sealing method between an electrolyte membrane and a frame is shown as an example, but it can also be used in the same manner between separators, and between the frame of a fuel cell and the electrolyte membrane or electrolyte membrane electrode assembly.

[Transfer Step]

As a transfer method, the release film on the light release side of the photocurable sheet-shaped sealing agent is peeled off, and then pressure-bonding is performed on the electrolyte membrane. Transfer while applying heat and pressure using a roll laminator is preferred from the viewpoint of enhancing the adherence to the adherend.

[Bonding Step]

After transfer, the base film remaining on the photocurable sheet-shaped sealing agent is peeled off to bond it to the frame, and bonding is performed by pressing while applying heat. Here, bonding in a vacuum or reduced pressure atmosphere is preferred from the viewpoint of enabling bonding without air bubbles. Examples of bonding devices include vacuum presses, vacuum laminators, and autoclaves.

[Curing Step]

The photocurable sheet-shaped sealing agent can be cured and integrated by irradiating active energy rays from the frame side of the bonded module. The photocurable sheet-shaped sealing agent of the present invention cures quickly even by irradiation with active energy rays, forming a tough cured product, as well as developing strong adherence to the electrolyte membrane or plastic. For the irradiation with active energy rays, an irradiation light in the 150 to 750 nm wavelength range is preferred, and curing can be performed at a cumulative light intensity of 1 to 100 $kJ/m^2$, preferably a cumulative light intensity of 5 to 70 $kJ/m^2$, using a low pressure mercury lamp, a medium pressure mercury lamp, a high pressure mercury lamp, an ultra high pressure mercury lamp, a xenon lamp, a metal halide lamp or an LED lamp.

The second sealing method is as follows.

It is a method for sealing at least a portion between at least two flanges of a component to be sealed having the at least two flanges, characterized by including a step of transferring the photocurable sheet-shaped sealing agent for fuel cell of the present invention to at least one of the flanges, a step of irradiating the transferred photocurable sheet-shaped sealing agent for fuel cell with an activation energy ray to cure the photocurable sheet-shaped sealing agent for fuel cell, thereby forming a gasket composed of the cured product, and a step of placing the other flange on the gasket and pressure-bonding the one flange to which the photocurable sheet-shaped sealing agent for fuel cell has been transferred on the other flange via the gasket, thereby sealing at least a portion between the at least two flanges.

In the step of transferring the photocurable sheet-shaped sealing agent for fuel cell of the first and second sealing methods, the photocurable sheet-shaped sealing agent for fuel cell is preferably pre-die cut into a shape required for sealing to optimize its dimensions and shape.

The storage elastic modulus (25° C.) of the photocurable sheet-shaped sealing agent for fuel cell of the present invention is $1\times10^4$ to $1\times10^9$ Pa, and particularly preferably $1\times10^5$ to $1\times10^8$ Pa. Details of the storage elastic modulus test are shown in the Examples. Being in the above range allows the cured product to be soft, and therefore allows it to sufficiently absorb shocks if external stresses are applied to the fuel cell, thus preventing the degradation of the fuel cell's battery performance.

In addition, the elongation rate of the cured product of the photocurable sheet-shaped sealing agent for fuel cell of the present invention is preferably 50 to 2000%, more preferably 100 to 1500%, and particularly preferably 150 to 1200%. The elongation rate is the value measured in accordance with JIS K6251:2010. Details of the elongation rate test are shown in the Examples. Being in the above range allows the cured product to absorb the strain generated by the cure shrinkage of the sealing agent when bonding the electrolyte membrane and the frame, and therefore allows to provide a fuel cell with excellent durability such as thermal cycling resistance.

In addition, the hydrogen gas permeability of the cured product of the photocurable sheet-shaped sealing agent for fuel cell of the present invention is preferably $1.0\times10^{-14}$ or less. The lower limit of the hydrogen gas permeability of the cured product is not particularly limited, and is, for example, $1.0\times10^{-15}$ or more. Being in the above range allows to sufficiently seal the hydrogen gas and maintain the battery performance of the fuel cell.

EXAMPLES

Hereinafter, the present invention will be further described in detail using examples, but the present invention is not limited to these examples.

Synthesis Example 1: Urethane Acrylate (a1)

To a glass reaction vessel equipped with a thermometer, a stirrer, and a reflux tube, 582.26 parts by mass of methyl ethyl ketone, 59.94 parts by mass of isophorone diisocyanate, 0.05 parts by mass of 4-methoxyphenol, and 0.1 parts by mass of dibutyltin dilaurate were added, and the mixture was heated to 60° C. while stirring. To this was added dropwise 520 parts by mass of polycarbonate diol (T5651, manufactured by Asahi Kasei Chemicals Corporation) heated to 70° C. After the dropwise addition, the mixture was reacted with stirring for 3 hours. Then, 2.32 parts by mass of 2-hydroxyethyl acrylate was added dropwise, and after the dropwise addition, the mixture was reacted with stirring for 3 hours. The molar ratio of isophorone diisocyanate polycarbonate diol was 1:2. The reaction was terminated by confirming the disappearance of the isocyanate groups by infrared spectroscopy to obtain polycarbonate urethane acrylate. The weight average molecular weight was 60,000.

Synthesis Example 2: Terminal Acrylate-Containing Polyorganosiloxane (a'1)

To 2000 parts by mass of silanol-both terminated polydimethylsiloxane having a weight average molecular weight of 20,000, 8 parts by mass of aminopropylmethyldimethoxysilane was added, and the mixture was reacted with stirring at 100° C. for 2 hours under nitrogen replacement to obtain amino-terminated polydimethylsiloxane. Then, to 100 parts by mass of the obtained resin, 0.8 parts by mass of 2-isocyanatoethyl acrylate was added and the mixture was reacted with stirring at 50° C. for 1 hour under nitrogen replacement to obtain terminal acrylate-containing polyorganosiloxane.

Preparation of Photocurable Sheet-Shaped Sealing Agent

Example 1

100 parts by mass of urethane acrylate as (a1) of the component (A) of the present invention, 33 parts by mass of phenoxy resin (jER4250 manufactured by Mitsubishi Chemical Corporation), which is a copolymer of bisphenol A type and bisphenol F type and has a glass transition temperature of 70° C., as (b1) of the component (B), 2 parts by mass of bis(2,4,6-trimethylbenzoyl)-phenylphosphine oxide (TPO manufactured by IGM Resins B.V.) as the component (c1) of component (C), 1 part by mass of polyethylene glycol dimethacrylate (23G manufactured by Shin-Nakamura Chemical Co., Ltd.) having 23 repeating ether bonds, which is (d1) of the component (D), and 1 part by mass of polyethylene glycol dimethacrylate (14G manufactured by Shin-Nakamura Chemical Co., Ltd.) having 14 repeating ether bonds, which is (d2), 1 part by mass of γ-methacryloxypropyl-trimethoxysilane (KBM-503 manufactured by Shin-Etsu Chemical Co., Ltd.), which is (e1) of the component (E), and 10 parts by mass of the organic solvent methyl ethyl ketone were added and mixed in a mixer at room temperature (25° C.) for 60 minutes under light shielding to obtain a sealing agent composition.

Next, the sealing agent composition was coated on a polyethylene terephthalate (PET) release film (35 μm) and placed in a 100° C. environment for 10 minutes to remove the solvent and dry. A PET release film (25 μm) was then bonded to the coated surface from which the solvent had been removed to obtain Example 1, a photocurable sheet-shaped sealing agent with an adhesive layer thickness of 50 μm.

Example 2

Example 2 was obtained by preparing in the same manner as Example 1, except that the components (d1) and (d2) of Example 1 were excluded.

Comparative Example 1

Comparative Example 1 was obtained by preparing in the same manner as Example 1, except that terminal acrylate-containing polyorganosiloxane, component (a'1), was used instead of the component (a1) of Example 1.

Comparative Example 2

Comparative Example 2 was obtained by preparing in the same manner as Example 1, except that the component (b1) of Example 1 was excluded.

The test methods used in the Examples and Comparative Examples of Table 1 are as follows.

<(1) Sheet Formability Test>

The appearance of each photocurable sheet-shaped sealing agent was visually observed while present on the polyethylene terephthalate film. The observation results were evaluated according to the following criteria. The results are shown in Table 1.

Pass: uniform and extremely smooth

Fail: not uniform, with many irregularities and pinholes (small holes appearing on the surface of the sheet) on the surface.

<(2) Hydrogen Gas Permeability Test>

Each photocurable sheet-shaped sealing agent was irradiated with ultraviolet light for 20 seconds to a cumulative light intensity of 45 $kJ/m^2$ using an ultraviolet irradiation machine to prepare a sheet-shaped cured product of 1 mm thickness. The sheet-shaped cured product was then used for measurement in accordance with JIS K7126-1:2006 (Plastics—Film and sheeting—Determination of gas-transmission rate—Part 1: Differential-pressure method). The test was conducted using a pressure sensor method and the measurements were performed under the conditions of 23° C. and 100 kPa for the test gas (hydrogen gas) on the high pressure side. The results are shown in Table 1. In the present invention, $1.0\times10^{-14}$ $mol\cdot m/m^2\cdot s\cdot Pa$ or less is preferred. Therefore, in Table 1, $1.0\times10^{-14}$ $mol\cdot m/m^2\cdot s\cdot Pa$ or less was considered as pass.

<(3) Adherence Test to Electrolyte Membrane>

Using each photocurable sheet-shaped sealing agent, a PET film (10 mm width×500 m length×400 μm thickness) and an electrolyte membrane of fluorinated polymer with sulfonic acid groups (Nafion manufactured by DuPont) were bonded into 10 mm width×500 m length, and cured by irradiating ultraviolet light with a cumulative light intensity of 50 $kJ/m^2$ from the PET film side to obtain a test specimen. Next, the peel strength when pulling the PET film from the electrolyte membrane in a 180-degree direction at a speed of 10 mm/min using a tensile tester was measured. The results are shown in Table 1. In the present invention, 1.5 N/mm or more is preferred. Moreover, when pulled in the tensile test, Examples 1 and 2 had material failure of the electrolyte membrane during the test. Comparative Example 2, on the other hand, did not have any material failure of the electrolyte membrane. "Not measured" for Comparative Example 1 in Table 1 means that the present test was not conducted because the (2) hydrogen gas permeability test was failed.

TABLE 1

| | | Example 1 | Example 2 | Comparative Example 1 | Comparative Example 2 |
|---|---|---|---|---|---|
| (1) Sheet formation | | Pass | Pass | Pass | Fail |
| (2) Hydrogen gas permeability ($mol\cdot m/m^2\cdot s\cdot Pa$) | | $1.69\times10^{-15}$ | $1.81\times10^{-15}$ | $1.01\times10^{-13}$ | $3.46\times10^{-15}$ |
| (3) Adherence test to electrolyte membrane | Peel strength (N/mm) | 2.1 | 2 | Not measured | 1.5 |
| | Material failure of electrolyte membrane | Failure | Failure | Not measured | No failure |

Examples 1 and 2 in Table 1 show that the present invention can provide a photocurable sheet-shaped sealing agent for fuel cell having adherence to an electrolyte membrane and low hydrogen gas permeability.

Comparative Example 1 in Table 1 is a photocurable sheet-shaped sealing agent using the component (a'1), terminal acrylate-containing polyorganosiloxane, instead of the component (A) of the present invention, but resulted in significantly inferior low hydrogen gas permeability. In addition, Comparative Example 2 is a photocurable sheet-shaped sealing agent excluding the component (B) of the present invention, but resulted in inferior sheet formability and adherence to the electrolyte membrane.

Furthermore, (4) the storage elastic modulus and (5) the elongation rate were tested.

<(4) Storage Elastic Modulus Test>

The photocurable sheet-shaped sealing agent of Example 1 was cured by irradiating ultraviolet light to a cumulative light intensity of 50 $kJ/m^2$. The elastic modulus of the cured product was then measured. A dynamic viscoelasticity measuring device (DMS6100 manufactured by Seiko Instruments Inc.) was used as the measuring device. As a test specimen, a sample obtained by overlapping the photocurable sheet-shaped sealing agents removed from the PET film to a thickness of 0.6 mm was prepared, and the storage elastic modulus at 25° C. was determined. The measurement frequency was set at 1 Hz. In the present invention, the storage elastic modulus of the cured product is preferably in the range of $1\times10^4$ to $1\times10^9$ Pa. The storage elastic modulus of the cured product of the photocurable sheet-shaped sealing agent of Example 1 was $5\times10^6$ Pa.

<(5) Measurement of Elongation Rate>

The photocurable sheet-shaped sealing agent of Example 1 was irradiated with ultraviolet light at 50 $kJ/m^2$ to prepare a cured product. The cured product was prepared by cutting a test specimen to a thickness of 0.6 mm, a total length of 50 mm, and a width of 10 mm. The test specimen was then pulled by a tensile tester until it reached breakage and measured in accordance with JIS K6251:2010. The pulling speed was set at 500 mm per minute. In the present invention, the elongation rate of the cured product is preferably 50 to 2000%. The elongation rate of the cured product of the photocurable sheet-shaped sealing agent of Example 1 was 870%.

INDUSTRIAL APPLICABILITY

As the present invention was made in consideration of the above circumstances and is a photocurable sheet-shaped sealing agent having adherence to an electrolyte membrane and a hydrogen gas barrier, it can be used for various sealing applications. In particular, it is industrially useful as it is effective as a curable sealing agent for fuel cell.

The present application is based on Japanese Patent Application No. 2020-172734, filed on Oct. 13, 2020, the disclosure of which is incorporated herein in its entirety by reference.

REFERENCE SIGNS LIST

1: cell of solid polymer fuel cell
2: separator
3*a*: air electrode (cathode)
3*b*: fuel electrode (anode)
4: polymer electrolyte membrane
5: electrolyte membrane electrode assembly (MEA)
6: frame
7: adhesive or sealing agent
8*a*: oxidizing gas channel
8*b*: fuel gas channel
9: cooling water channel
10: cell stack
11: solid polymer fuel cell

The invention claimed is:

1. A photocurable sheet-shaped sealing agent for a fuel cell, comprising a component (A): urethane (meth)acrylate, a component (B): a phenoxy resin, a component (C): a photopolymerization initiator, and a component (D): a (meth)acrylate monomer having 8 to 25 repeating ether bond structural units.

2. The photocurable sheet-shaped sealing agent for the fuel cell according to claim 1, wherein the component (A) has a polycarbonate backbone.

3. The photocurable sheet-shaped sealing agent for the fuel cell according to claim 1, wherein a glass transition temperature of the component (B) is 50 to 120° C.

4. The photocurable sheet-shaped sealing agent for the fuel cell according to claim 1, wherein a weight average molecular weight of the component (A) is 20,000 to 100,000.

5. The photocurable sheet-shaped sealing agent for the fuel cell according to claim 1, wherein the sealing agent comprises 4 to 70 parts by mass of the component (B) per 100 parts by mass of the component (A).

6. The photocurable sheet-shaped sealing agent for the fuel cell according to claim 1, wherein the component (C) has a photoinitiator compound that has an absorption wavelength at 365 nm or more and decomposes upon irradiation with ultraviolet light with a wavelength at 365 nm or more, thereby generating radicals involved in polymerization.

7. The photocurable sheet-shaped sealing agent for the fuel cell according to claim 1, wherein the photocurable sheet-shaped sealing agent for the fuel cell is a sealing agent between adjacent separators in a fuel cell, or a sealing agent between a fuel cell frame and an electrolyte membrane or electrolyte membrane electrode assembly.

8. A cured product obtained by curing the photocurable sheet-shaped sealing agent for the fuel cell according to claim 1.

9. The cured product according to claim 8, wherein the cured product has a hydrogen gas permeability of $1.0\times10^{-14}$ $mol\cdot m/m^2\cdot s\cdot Pa$ or less.

10. A fuel cell, comprising the cured product according to claim 8.

11. A photocurable sheet-shaped sealing agent for a fuel cell, obtained by applying, to a seal adherend, a coating solution comprising a component (A): urethane (meth)acrylate, a component (B): a phenoxy resin, a component (C): a photopolymerization initiator, a component (D): a (meth) acrylate monomer having 8 to 25 repeating ether bond structural units, and an organic solvent, and drying the organic solvent.

* * * * *